United States Patent
Hutchison et al.

(10) Patent No.: US 6,457,022 B1
(45) Date of Patent: Sep. 24, 2002

(54) METHODS, SYSTEMS AND COMPUTER PROGRAM PRODUCTS FOR MIRRORED FILE ACCESS THROUGH FORCED PERMISSIONS

(75) Inventors: Robert Brian Hutchison, Raleigh; Mark Gregory McClanahan, Wake Forest; Joel Mark Yarborough, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 09/587,691

(22) Filed: Jun. 5, 2000

(51) Int. Cl.⁷ .............................................. G06F 17/30
(52) U.S. Cl. ........................................ 707/204; 707/9
(58) Field of Search ...................... 707/204, 9

(56) References Cited

U.S. PATENT DOCUMENTS

| | | | |
|---|---|---|---|
| 4,447,874 A | 5/1984 | Bradley et al. ............. 364/200 |
| 5,077,795 A | * 12/1991 | Rourke et al. ................ 380/55 |
| 5,263,165 A | 11/1993 | Janis ........................... 395/725 |
| 5,305,440 A | 4/1994 | Morgan et al. ............. 395/200 |
| 5,537,533 A | * 7/1996 | Staheli et al. .................. 714/5 |
| 5,619,657 A | 4/1997 | Sudama et al. ......... 395/200.06 |
| 5,649,099 A | 7/1997 | Theimer et al. ........ 395/187.01 |
| 5,799,141 A | 8/1998 | Galipeau et al. ....... 395/182.11 |
| 5,875,296 A | 2/1999 | Shi et al. ................ 395/188.01 |
| 5,918,228 A | 6/1999 | Rich et al. ..................... 707/10 |
| 6,181,142 B1 | * 1/2001 | Win et al. ................... 709/229 |
| 6,252,952 B1 | * 6/2001 | Kung et al. ............... 379/114.1 |
| 6,292,905 B1 | * 9/2001 | Wallach et al. ................. 714/4 |

* cited by examiner

*Primary Examiner*—Wayne Amsbury
(74) *Attorney, Agent, or Firm*—J. Bruce Schelkopf; Myers Bigel Sibley & Sajovec, P.A.

(57) ABSTRACT

Methods, systems and computer program products are provided which assure access to files which are mirrored between at least a first storage device and a second storage device by controlling access to the first and second storage devices so that owners of files which are to be mirrored between the first and the second storage devices are within a common user group. A predefined set of permissions are established for the common user group and permissions of members of the common user group are forced to the predefined set of permissions. Thus, files and directories owned by members of the common user group will be forced to have the permissions of the common user group. Files and directories owned by members of the common user group are mirrored between the first and the second storage devices.

41 Claims, 5 Drawing Sheets

METHODS, SYSTEMS AND COMPUTER PROGRAM PRODUCTS FOR MIRRORED FILE ACCESS THROUGH FORCED PERMISSIONS

RELATED APPLICATIONS

The present application is related to commonly assigned and concurrently filed U.S. Pat. Application Ser. No. 09/587,690 entitled "METHODS, SYSTEMS AND COMPUTER PROGRAM PRODUCTS FOR MIRRORED FILE ACCESS THROUGH CONTROLLED ACL MODIFICATION", attorney docket number RAL9-99-173 and U.S. Pat. Application Ser. No. 09/587,688, "METHODS, SYSTEMS AND COMPUTER PROGRAM PRODUCTS FOR MIRRORED FILE ACCESS THROUGH ASSUMING A PRIVILEGED USER LEVEL", attorney docket number RAL9-99-171, the disclosures of which are incorporated by reference as if set forth fully herein.

FIELD OF THE INVENTION

The present invention relates to file systems and more particularly to mirroring files between at least two storage devices.

BACKGROUND OF THE INVENTION

In many applications of data storage systems, reliability and availability are critical performance issues. For example, in a retail solution availability of a data processing system to process retail transactions may be essential. In such systems where reliability and availability are critical performance issues, mirroring of storage devices, such as hard drives or the like, may be beneficial. Mirroring storage devices may be carried out by replicating files on one storage device onto another storage device.

As an example of a mirrored file system, the 4690 Point-of-Sale operating system available from International Business Machines Corporation of Armonk, N.Y., provided a proprietary operating system for the retail environment. File mirroring operations could be provided in such a proprietary operating system by providing a file mirroring kernel which performed the mirroring operations. Such a kernel generally had complete access to the data of a storage device and would cause duplicate file operations to be performed for file operations to a preselected drive. Such control of the mirrored file system could be provided because of the close linkage between the proprietary operating system and the file mirroring kernel.

Furthermore, because of the purpose-specific nature of the proprietary operating system, a simple file access system could be provided with minimal concerns for security and control of access to files by non-well behaved processes. However, in a more general purpose environment, such as systems utilizing general purpose multi-user operating systems such as WindowsNT from Microsoft Corporation, Redmond, Wash. or Unix, AIX from International Business Machines Corporation, Armonk, N.Y., Solaris from Sun Microsystems, Palo Alto, Calif. or Linux, concerns over security and file access may make the mirroring of files more complex.

Files in such general purpose systems generally have a set of permissions associated with them which are controlled by an "owner" of the file. The owner is, typically, the user or process which created the file. The set of permissions may be quite complex and vary from file to file. For example, certain of these permissions may make a file "invisible" or undetectable to other users or processes which do not have the appropriate set of permissions. As such, a mirroring process may be unable to detect the presence of certain files or be unable to read files in order to mirror the file to a secondary storage device. Also, the owner of a file may change its permissions and, thus, make a file which was once detectable, undetectable.

As described above, on a general purpose operating system, a mirroring process executing on a primary system may be unable to detect or read files if it does not have the proper set of permissions to access the files. Thus, the mirroring process may be unable to mirror the files from the primary data storage device to a secondary data storage device. Furthermore, a failure to mirror such files may be difficult, if not impossible, to detect prior to occurrence of a failure as the mirroring process may have no indication that a file exists and, therefore, may not know that it has failed to mirror the file. Such a failure to mirror critical files may be catastrophic in a system failure condition where operations are transferred to a data processing system associated with the secondary storage device. In such a case, the files needed to resume operations may be missing and the transfer of operations may be impossible.

Additionally, in the event of a failure, there may be no guarantee that the permissions associated with files on the primary system will be the same as those on the mirrored system. Thus, if a transfer is required from the primary system to the mirrored system, some applications which utilize mirrored files may be subsequently unable to access the files because of a difference in permissions. Accordingly, the backup of files by a storage device mirroring scheme may not provide the "live" backup that may be desired.

In light of the above discussion, a need exists for improvements in file mirroring systems.

SUMMARY OF THE INVENTION

Embodiments of the present invention include methods, systems and computer program products which provide access to files which are mirrored between at least a first storage device and a second storage device by controlling access to the first and second storage devices so that owners of files which are to be mirrored between the first and the second storage devices are within a common user group. A predefined set of permissions are established for the common user group and permissions of members of the common user group are forced to the predefined set of permissions. Thus, files owned by members of the common user group will be forced to have the permissions of the common user group. Files owned by members of the common user group are mirrored between the first and the second storage devices.

In particular embodiments of the present invention, controlling access to the storage devices may include rejecting an access of the first storage device if a user associated with the access is not a member of the common user group.

In further embodiments of the present invention, a mirroring process is established as a member of the common user group. In such embodiments, files owned by members of the common user group may be mirrored between the first and the second storage devices utilizing the mirroring process.

In additional embodiments of the present invention, permissions of members of the common user group may be forced to the predefined set of permissions by determining if a communication with a file system associated with the first storage device is from a member of the common user group and determining if the communication changes the permissions of the member of the common user group. The permissions specified by the communication may be ignored if the communication changes the permissions to a set of permissions different from the predefined set of permissions.

In particular embodiments of the present invention, the communication with the file system associated with the first storage device may be intercepted. In such a case, the permissions in the intercepted communication may be ignored by replacing permissions specified by the communication with the predefined set of permissions if the communication changes the permissions of the member of the common user group so as to provide a revised communication with the file system. The revised communication may be forwarded to the file system associated with the first storage device to replace the original intercepted communication and mirrored to the secondary storage devices to assure the file permissions on the first and secondary storage devices are identical.

In further embodiments of the present invention, the first and second storage devices are associated with a general purpose multi-user operating system and the common user group is a group of users of the general purpose multi-user operating system. Furthermore, the general purpose multi-user operating system may be a Unix-type operating system. For example, the Unix-type operating system may be Unix, AIX, Solaris or Linux.

In still further embodiments of the present invention, the first storage device is associated with a first data processing system and the second storage device is associated with a second data processing system different from the first data processing system. In such embodiments, the common user group may be established on the first data processing system and the common user group replicated on the second data processing system.

In additional embodiments of the present invention, a file mirroring system may be provided. The file mirroring system may include a primary storage device and a mirrored storage device. A file system may be configured to control the primary storage device and a user group associated with the primary storage device. A mirror process associated with the user group is configured to mirror files owned by members of the user group from the primary storage device to the mirrored storage device. A file access kernel is configured so as to intercept communications with the file system and configured so as to force permissions of the user group to a predefined set of permissions.

In further embodiments of the file mirroring system, the primary storage device is part of a first data processing system and the mirrored storage device is part of a second data processing system. Furthermore, the user group associated with the primary storage device may be established on both the first and the second data processing systems. The file system may also be a file system of a general purpose multi-user operating system such as a Unix-type operating system.

While the invention has been described above primarily with respect to method aspects of the invention, both systems and/or computer program products are also provided.

DETAILED DESCRIPTION OF PREFERRED EMBODIMENTS

Figure 1:
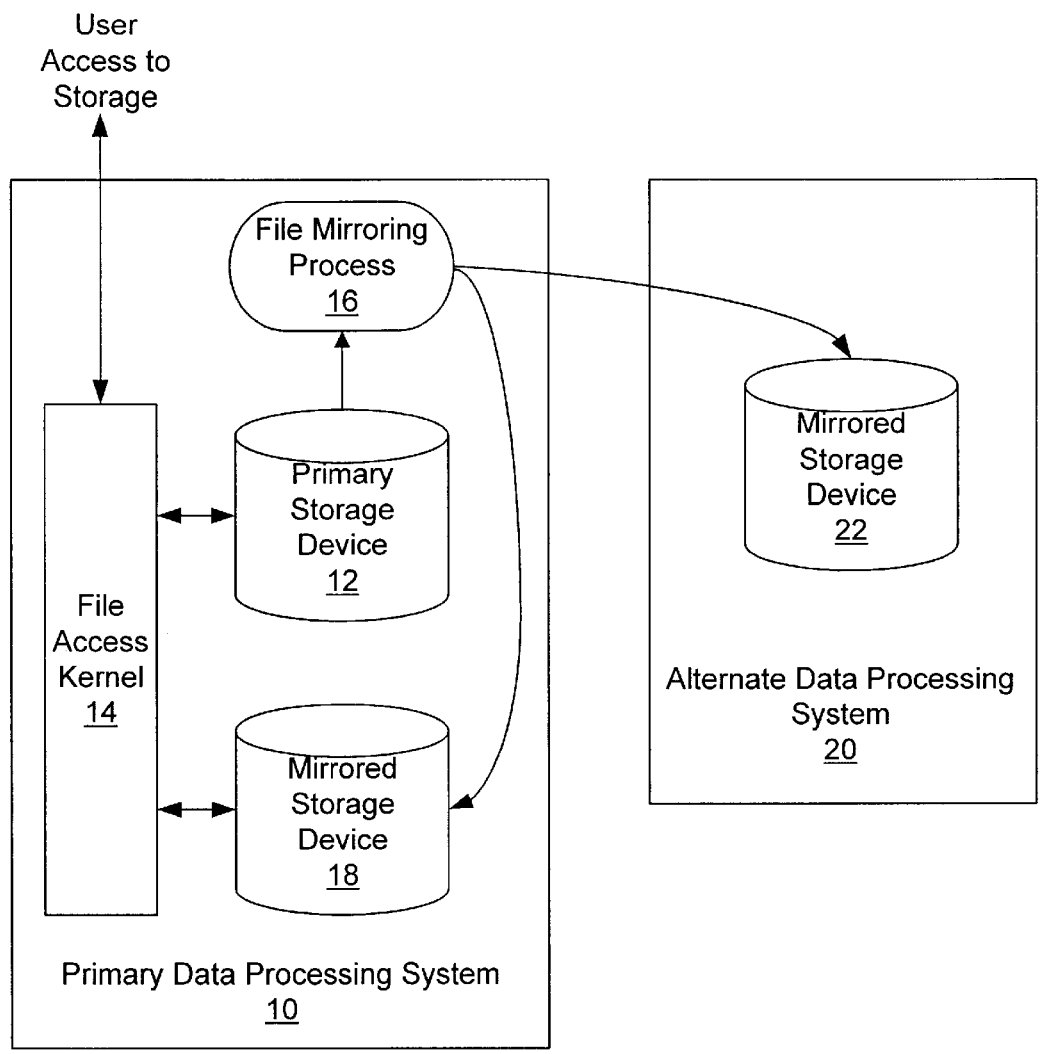
FIG. 1 is a block diagram of a file mirroring system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized-including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides mirrored file access by forcing permissions of users of a storage device for which mirroring is to be carried out to a predefined set of permissions. According to various embodiments of the present invention, each user, including a mirroring process, is placed in a common user group. All users in this user group are then provided the same file access permissions such that files owned by members of the user group will be visible to other members of the user group. Such permissions may also be established on a data processing system associated with the secondary storage device so as to assure proper access to files in the event of failure of the primary storage device. These permissions are then maintained irrespective of whether a user attempts to change their or someone else's permissions. Various embodiments of the present invention will now be described with reference to FIGS. 1 through 5.

Referring now to FIG. 1, a file mirroring system according to embodiments of the present invention is illustrated. As is seen in FIG. 1, a primary data processing system 10 has associated with it a primary storage device 12. The primary data processing system 10 also may have a file access kernel 14 or other file access program, subroutine or process which receives all access attempts by users for the primary storage device 12. The primary data processing system 10 may also have a file mirroring process 16 which may perform a mirroring function so as to replicate files stored on the primary storage device 12 on a secondary storage device, such as the mirrored storage device 18 located at the primary data processing system 10 or alternatively to a mirrored storage device 22 associated with an alternate data processing system 20.

Generally, the file access kernel 14 or the file mirroring process 16 monitors the primary storage device 12 so as to detect file operations to the primary storage device 12 which modify files/directories which are replicated such as, for example, write, create, delete, and make_directory operations or the like. As used herein, the terms file operation or file communication refer to any operation against a file, directory, or extension of a file or directory, such as a file/directory attribute, extended attribute, or related on disk file directory structures, etc. These operations are then replicated to at least one of the mirrored storage devices 18 and 22. Which operations are replicated may be based on the drive being written to, the location on the drive being written, to the file being written, or the user writing the file. For example, only certain directories may be replicated. Thus, the file mirroring process 16 may mirror some or all of the files stored on the primary storage device 12.

As will be appreciated by those of skill in the art, the file mirroring process 16 may be a stand-alone application, may be provided as a kernel, such as by incorporation into the file access kernel 14 or may be part of an operating system executing on the primary data processing system 10. The File mirroring process 16 may also be part of a device driver such as, for example a device driver for the primary storage device 12.

As described briefly above, according to embodiments of the present invention, all users for which mirrored file access is to be provided are preferably associated with a common user group. A predefined set of permissions is defined for the users in the common user group so that files owned by such users will have a common set of permissions. Preferably, the file mirroring process 16 is included within the common user group. The file access kernel 14 forces the permissions for files owned by members of the user group to the common set of permissions. As will be appreciated by those of skill in the art in light of the present disclosure, as used herein the term "user" refers to a user of a multi-user operating system or a process, application or other program which is owned by such a user. Typically, the "user" paradigm of multi-user operating systems provides a mechanism by which a set of permissions and/or authorities are associated with a process, program, application or other such data processing operation which may access files on the primary storage device 12 such that permissions of a user may be utilized to determine permissible operations or accesses of a particular file.

In particular embodiments of the present invention, the file access kernel 14 receives all accesses to a file access system associated with the primary storage device 12 and, optionally, the mirrored storage device 18 and/or 22. Among other things, the file access kernel 14 may evaluate each of the accesses associated with the primary storage device 12 to determine if the accesses attempt to change the permissions associated with a file owned by a user in a common user group of users for which files are to be mirrored. If so, the file access kernel 14 forces the permissions to the common set of permissions for the common user group. In such a manner, the file mirroring process 16 may be assured to have access to the files of the common user group so as to mirror the files to a mirrored storage device, such as mirrored storage devices 18 and/or 22.

As will be apparent to those of skill in the art in light of the present disclosure, the functions of the file access kernel 14 may be separate from the operating system or may be incorporated into the operating system of the data processing system 10. Furthermore, the file mirroring process 16 may also be incorporated into the file access kernel 14. Accordingly, systems according to embodiments of the present invention may deviate from the configuration illustrated in FIG. 1 while still benefitting from the teachings of the present invention.

While FIG. 1 illustrates a single mirrored storage device 18 on the primary data processing system 10 and a single mirrored storage device 22 on the alternate data processing system 20, the present invention should not be limited to such configurations. Embodiments of the present invention may be provided where mirroring is performed to multiple drives in a single data processing system or in multiple data processing systems. For example, where a storage device is mirrored to multiple data processing systems a network broadcast may be made of the mirroring operation, utilizing, for example, UDP messaging, so that each data processing system on the network may receive the mirroring operation and mirror the storage device to one or more storage devices local to the receiving data processing system. Accordingly, the present invention should not be construed as limited to the configuration of mirrored or mirroring drives or data processing systems illustrated in FIG. 1.

Furthermore, as used herein, the term storage device refers to all or part of a single physical storage device or all or part of multiple physical storage devices. Thus, for example, a storage device may be all or part of an output media such as CDROM, fixed disk, diskette, tape or other storage device or a partition or combination of output media such as a DOS compatible disk partition or a Unix compatible file system.

Figure 2:
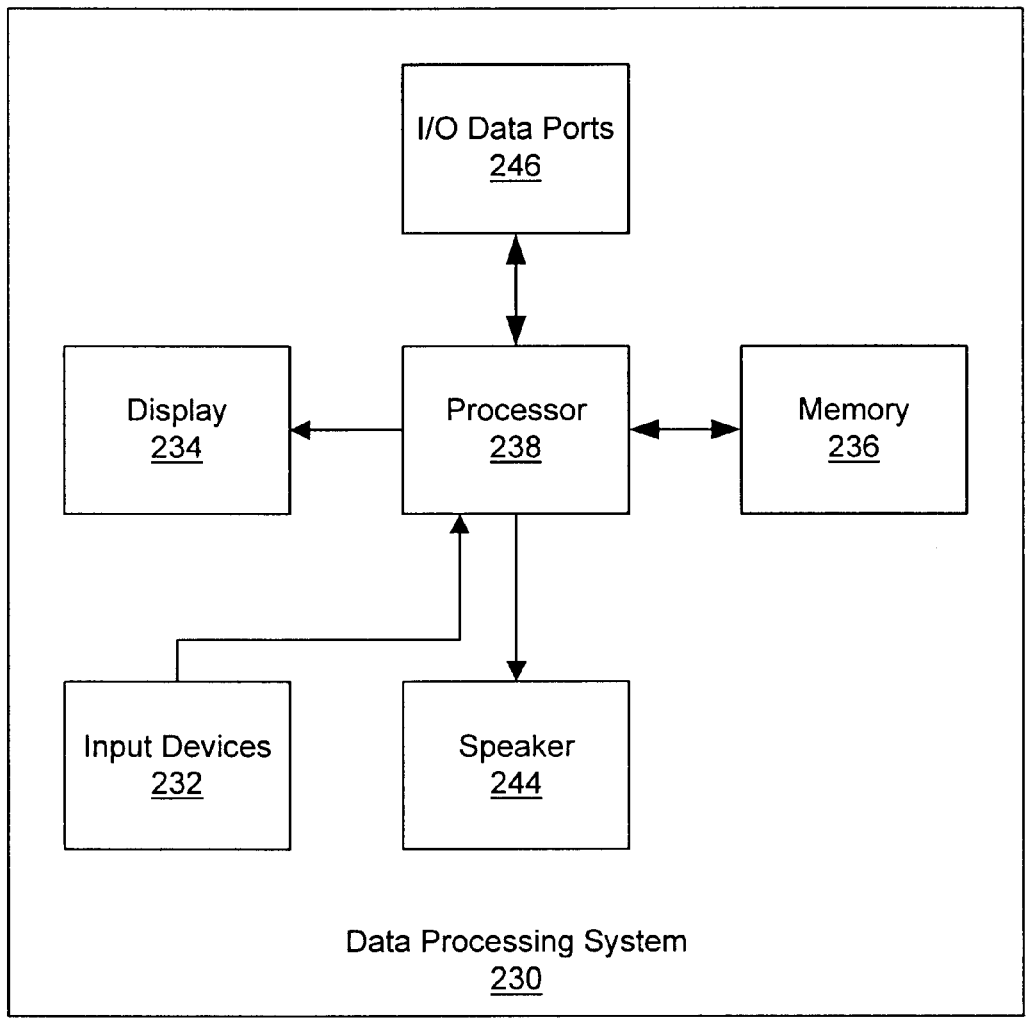
FIG. 2 is a block diagram of a data processing system suitable for use with the present invention.

An exemplary embodiment of a data processing system 230 suitable for use as either the primary data processing system 10 or the alternate data processing system 20 in accordance with embodiments of the present invention is illustrated in FIG. 2 and typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data port 246 can be used to transfer information between the data processing system 230 and another computer system or a network (e.g., the Internet). These components may be conventional components such as those used in many conventional data processing systems which may be configured in accordance with the present invention to operate as described herein.

Figure 3:
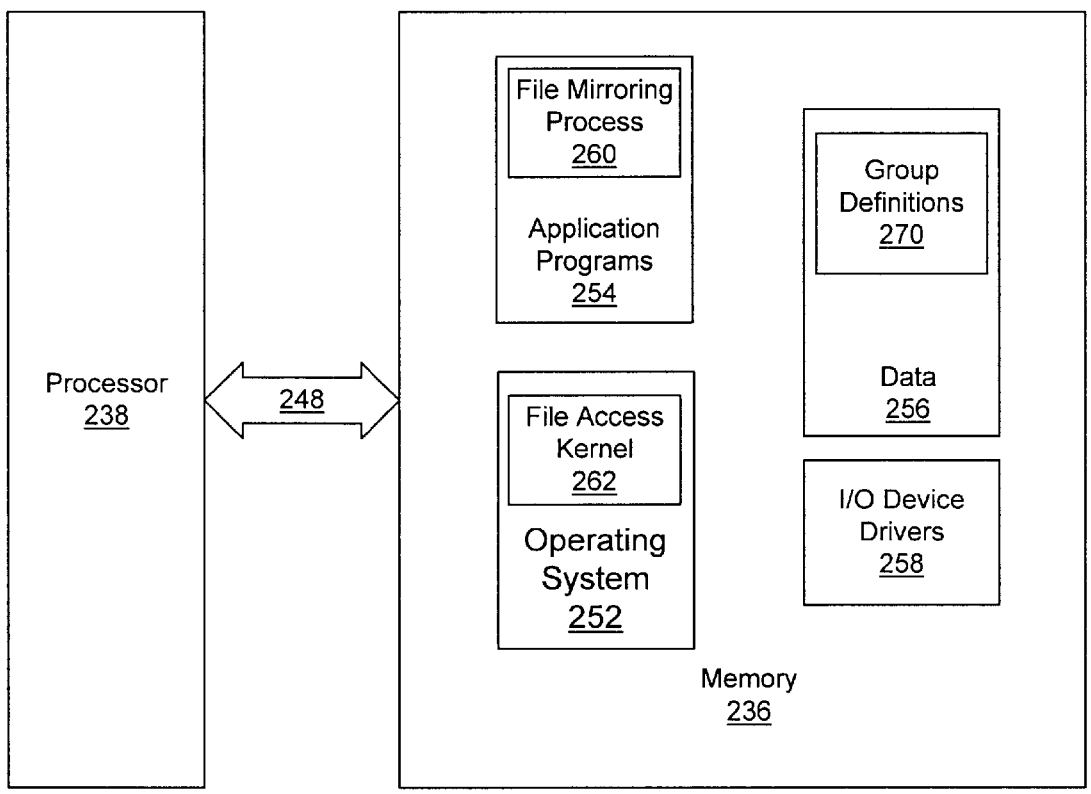
FIG. 3 is a more detailed block diagram of data processing systems according to embodiments of the present invention.

FIG. 3 is a block diagram of data processing systems that illustrates systems, methods, and computer program products in accordance with embodiments of the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash, SRAM, and DRAM.

As shown in FIG. 3, the memory 236 may contain several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., WindowsNT, Windows95, Windows98 or Windows2000 from Microsoft Corporation, Redmond, Wash., Unix or Linux, however, the present invention may be best suited for use with general purpose multi-user operating systems such as WindowsNT or Unix-type operating systems including Unix, AIX, Solaris and Linux.

The I/O device drivers 258 typically include software routines accessed through the operating system 252 by the application programs 254 to communicate with devices such as the input devices 232, the display 234, the speaker 244, the I/O data port(s) 246, and certain components of the memory 236. The application programs 254 are illustrative of the programs that implement the various features of the data processing system 230. The data 256 represents the static and dynamic data used by the application programs 254, operating system 252, I/O device drivers 258, and other software programs that may reside in the memory 236.

As is further seen in FIG. 3, the application programs 254 preferably include a file mirroring process 260 which mirrors data between at least two storage devices. The operating system 252 also preferably includes a file access kernel 262 which forces permissions of files owned by members of a group of users to a predefined set of permissions. Furthermore, the data portion of memory 236 preferably includes group definitions 270 which specify one or more users which are members of common user groups for mirroring files and may also include the permissions of files owned by members of the common user groups.

While the present invention is illustrated, for example, with reference to the file mirroring process 260 being an application program, as will be appreciated by those of skill in the art, the file mirroring function may also be incorporated into the operating system 252 or the I/O device drivers 258. Thus, the present invention should not be construed as limited to the configuration of FIG. 3 but is intended to encompass any configuration capable of carrying out the operations described herein.

Figure 4:
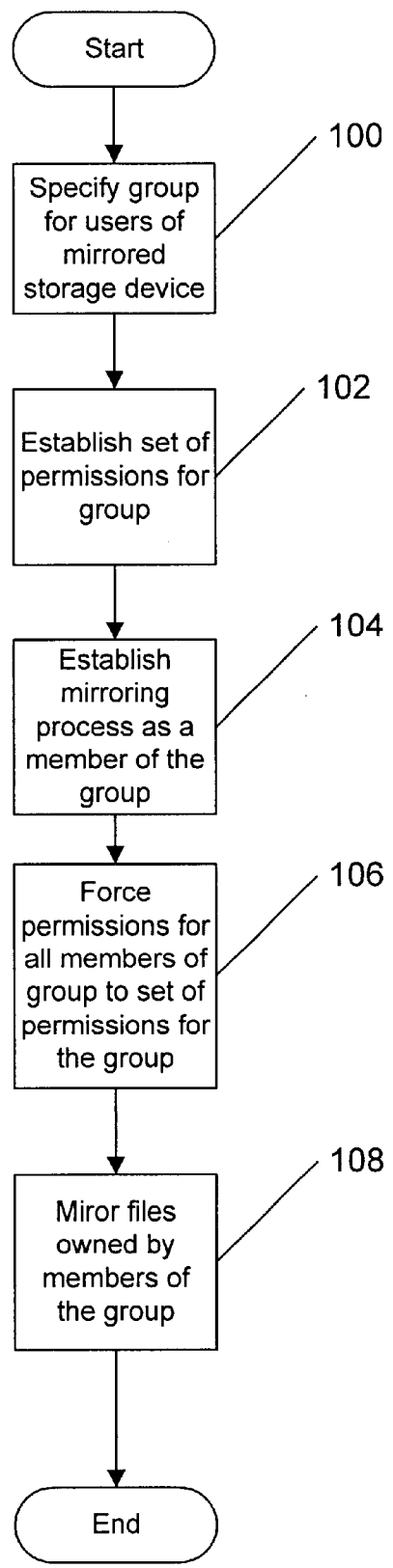
FIG. 4 is a flowchart illustrating operations according to embodiments of the present invention.

Embodiments of the present invention will now be described in more detail with reference to FIGS. 4 and 5 which are flowchart illustrations of operations according to embodiments of the present invention. As seen in FIG. 4, a group of users of a mirrored storage device is specified (block 100). A set of permissions is established for files owned by members of the group of users (block 102). The permissions established for the files owned by members of the group of users may be arbitrarily selected, however, the permissions should include sufficient permissions so as to allow files to be visible to other users which are members of the group of users and be read by other users which are members of the group of users. Furthermore, these permissions may be a minimum set of permissions for files owned by users which are members of the group of users. In such a case, the permissions for files owned by users which are members of the group of users would be forced to include at least the set of permissions specified for the group of users.

As an example, in an AIX embodiment of the present invention, the permissions may be set as RWX for the owner of a file and for other members of the group in which the owner is a member. While the permissions may be the same for users which are owners of files as for users which are members of the group of users in which the owner of a file is a member, these permissions may also be different. As long as the group permissions allow sufficient access to the files so as to allow for mirroring of the files the forced permissions of the present invention may provide for reliable mirroring of the files.

As is further seen in FIG. 4, the process which performs the mirroring function is also established as owned by a user which is a member of the group of users (block 104). The permissions for files owned by users which are members of the group are forced to include at least the permissions specified for files owned by users which are members of the group of users irrespective of whether a user which is a member of the group of users attempts to alter the permissions for a file owned by the user (block 106). As described above, the forcing of permissions for files owned by users which are members of the group of users may limit the permissions to the predefined set of permissions or may, alternatively, assure that the permissions of a file owned by a user which is a member of the group of users includes at least the predefined set of permissions. Such a forcing of permissions may occur at the file level, th directory level, the user level or both. Thus, for example, the default permissions of a user may be forced to the predefined set of permissions. Similarly, permissions specified for a particular file may be forced to the predefined set of permissions. As is further seen in FIG. 4, files owned by users which are members of the group are also mirrored by the mirroring function from a primary storage device to a secondary storage device (block 108).

Figure 5:
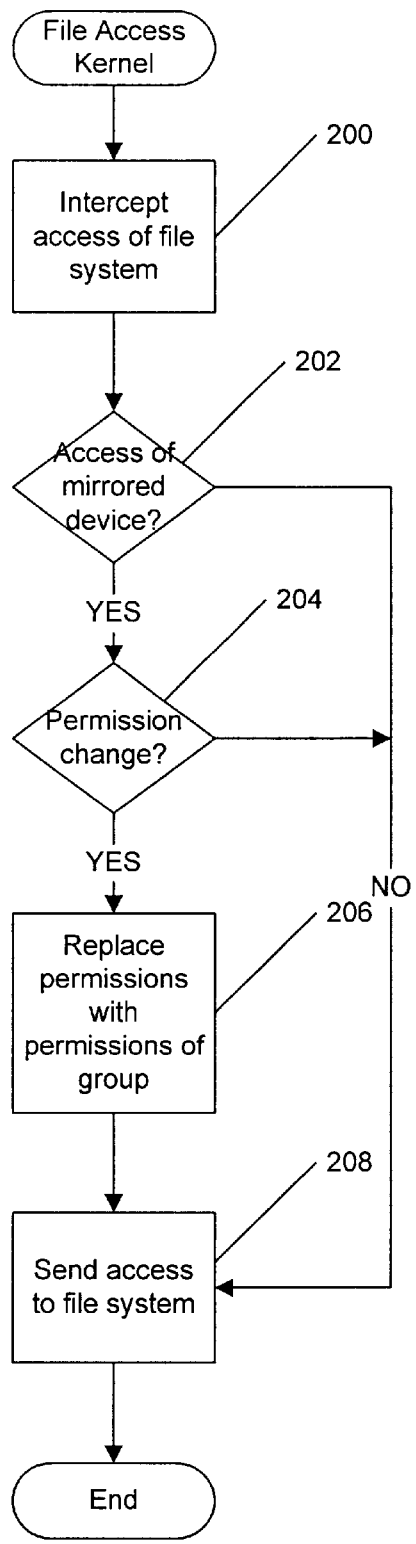
FIG. 5 is a flowchart illustrating operations according to further embodiments of the present invention.

FIG. 5 illustrates further embodiments of the present invention. As seen in FIG. 5, accesses to a file system are intercepted (block 200) and it is determined if the access is of a device to be mirrored (block 202). If not, then the access is forwarded to the file system (block 208). If, however, the access is of a mirrored device, then it is determined if the access includes an attempt to change the permissions of a file on the mirrored device (block 204). If the access does not attempt to change permissions, then the access is forwarded to the file system (block 208).

If the access does include an attempt to change permissions, then the permissions portion of the access are changed to replace the permissions with the permissions of the user group associated with the mirrored device or modified to include at least the permissions of the user group associated with the mirrored device (block 206). This modified access is then forwarded to the file system (block 208).

Alternatively, it could also be determined if the attempt to change permissions would change permissions for the user group. If so, then the permissions could be replaced. The permissions could be selectively replaced so as to allow owner permissions to be changed but not to allow group permissions to be changed which could affect the ability to mirror files to an alternate storage device. Thus, if the access of the mirrored device attempts to change the permissions of a file from those defined for the user group associated with the mirrored device, the permissions are forced to those associated with the user group so as to assure that the files on the mirrored device will be accessible by the mirroring function. Such a forcing of permissions may also assure that any applications associated with the mirrored device which are owned by users which are members of the user group will have access to any needed files if the applications are transferred to an alternate data processing system.

In addition to the operations described above with reference to FIG. 5, access to the mirrored device may also be limited to users which are members of the user group associated with the mirrored device. Thus, for example, in addition to determining if an access of the file system is an access of the mirrored device it could also be determined if the access of the mirrored device was by a user which was a member of the group of users associated with the mirrored device. If not, then the access could be rejected. In such a manner a requirement that all users of the mirrored device be members of the common user group could be enforced.

As an example of one embodiment of the present invention, in an AIX system, a user which is an owner of a file may be required to be a member of a Data Distribution System product group (FDS) to be allowed to write to a controlled mount point. This assures that only authorized users (members of the group FDS) could access controlled mount points. Furthermore, permissions could be established as follows:

owner: rwx (all)
group: rwx (all)
other: - - - (none)

where "owner" is the owner of a file and group is the group FDS in which the owner is a member. Thus, any files created at the controlled mount point must be created by a member of group FDS such that the group FDS will have the same permissions as the owner of the file. Furthermore, the data distribution (DD) process is also owned by a user which is a member of the group FDS and, therefore, all files created at the controlled mount point will be accessible to the DD process for mirroring.

By forcing permissions as described above, the DD process may have unhindered access to any file, allowing the file mirroring process to distribute, mirror or reconcile files as needed. Such forced permissions may also guarantee that user applications will run consistently regardless of the host file server. Furthermore, the forced permissions may be readily apparent on any command that shows file permissions and, therefore, a user or system administrator may readily determine who has access to a given file.

The flowcharts and block diagrams of FIGS. 1 through 5 illustrate the architecture, functionality, and operation of possible implementations providing file mirroring according to the present invention. In this regard, each block in the flow charts or block diagrams represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of providing access to files which are mirrored between at least a first storage device and a second storage device, comprising:

controlling access to the first and second storage devices so that owners of files which are to be mirrored between the first and the second storage devices are members of a common user group;

establishing a predefined set of permissions for files owned by members of the common user group;

forcing permissions of files owned by members of the common user group to include at least the predefined set of permissions; and mirroring files owned by members of the common user group between the first and the second storage devices.

2. A method according to claim 1, wherein the step of controlling access comprises the step of rejecting an access of the first storage device if a user associated with the access is not a member of the common user group.

3. A method according to claim 1, further comprising the step of establishing a mirroring process as owned by a member of the common user group; and wherein the step of mirroring files comprises the step of mirroring files owned by members of the common user group between the first and the second storage devices utilizing the mirroring process.

4. A method according to claim 1, wherein the step of forcing permissions of files owned by members of the common user group to include at least the predefined set of permissions comprises the steps of:

determining if a communication with a file system associated with the first storage device is from a member of the common user group;

determining if the communication changes the permissions of a file owned by a member of the common user group; and ignoring the permissions specified by the communication if the communication changes the permissions to a set of permissions which does not include the predefined set of permissions.

5. A method according to claim 4 wherein the determining step is preceded by the step of intercepting the communication with the file system associated with the first storage device; and wherein the step of ignoring the permissions comprises the step of replacing permissions specified by the communication with a set of permissions which includes at least the predefined set of permissions if the communication changes the permissions of a file owned by a member of the common user group to a set of permissions which does not include the predefined set of permissions so as to provide a revised communication with the file system.

6. A method according to claim 5, further comprising the step of forwarding the revised communication of the file system associated with the first storage device.

7. A method according to claim 1, wherein the step of forcing permissions of files owned by members of the common user group to include at least the predefined set of permissions comprises the steps of:

determining if a communication with a file system associated with the first storage device is from a member of the common user group;

determining if the communication changes the permissions of a file owned by a member of the common user group; and replacing the permissions specified by the communication with the predefined set of permissions if the communication changes the permissions of a file owned by a member of the common user group.

8. A method according to claim 1, wherein the first and second storage devices are associated with a general purpose multi-user operating system and wherein the members of the common user group include a group of users of the general purpose multi-user operating system.

9. A method according to claim 8, wherein the general purpose multi-user operating system is a Unix-type operating system.

10. A method according to claim 9, wherein the Unix-type operating system is selected from the group consisting of Unix, AIX, Solaris and Linux.

11. A method according to claim 1, wherein the first storage device is associated with a first data processing system and wherein the second storage device is associated with a second data processing system different from the first data processing system.

12. A method according to claim 11, wherein the common user group is established on the first data processing system, the method further comprising the step of replicating the common user group on the second data processing system.

13. A file mirroring system comprising:
a primary storage device;
a mirrored storage device;
a file system configured to control the primary storage device;
a user group associated with the primary storage device;
a mirror process associated with the user group and configured to mirror files owned by members of the user group from the primary storage device to the mirrored storage device; and
a file access kernel configured so as to intercept communications with the file system and configured so as to force permissions of the user group to a predefined set of permissions.

14. A system according to claim 13, wherein the primary storage device is part of a first data processing system and the mirrored storage device is part of a second data processing system.

15. A system according to claim 14, wherein the user group associated with the primary storage device is established on both the first and the second data processing systems.

16. A-system according to claim 13, wherein the file system is a file system of a general purpose multi-user operating system.

17. A system according to claim 16, wherein the general purpose multi-user operating system is a Unix-type operating system.

18. A system for providing access to files which are mirrored between at least a first storage device and a second storage device, comprising:

means for controlling access to the first and second storage devices so that owners of files which are to be mirrored between the first and the second storage devices are members of a common user group;

means for establishing a predefined set of permissions for files owned by members of the common user group;

means for forcing permissions of files owned by members of the common user group to include at least the predefined set of permissions; and means for mirroring files owned by members of the common user group between the first and the second storage devices.

19. A system according to claim 18, wherein the means for controlling access comprises means for rejecting an access of the first storage device if a user associated with the access is not a member of the common user group.

20. A system according to claim 18, further comprising means for establishing a mirroring process as owned by a member of the common user group; and wherein the means for mirroring files comprises means for mirroring files owned by members of the common user group between the first and the second storage devices utilizing the mirroring process.

21. A system according to claim 18, wherein the means for forcing permissions of files owned by members of the common user group to include at least the predefined set of permissions comprises:

means for determining if a communication with a file system associated with the first storage device is from a member of the common user group;

means for determining if the communication changes the permissions of a file owned by a member of the common user group; and means for ignoring the permissions specified by the communication if the communication changes the permissions to a set of permissions which does not include the predefined set of permissions.

22. A system according to claim 21, further comprising:
means for intercepting the communication with the file system associated with the first storage device; and wherein the means for ignoring the permissions comprises means for replacing permissions specified by the communication with a set of permissions which includes at least the predefined set of permissions if the communication changes the permissions of a file owned by a member of the common user group to a set of permissions which does not include the predefined set of permissions so as to provide a revised communication with the file system.

23. A system according to claim 22, further comprising means for forwarding the revised communication to the file system associated with the first storage device.

24. A system according to claim 18, wherein the means for forcing permissions of files owned by members of the common user group to include at least the predefined set of permissions comprises:
- means for determining if a communication with a file system associated with the first storage device is from a member of the common user group;
- means for determining if the communication changes the permissions of a file owned by a member of the common user group; and
- means for replacing the permissions specified by the communication with the predefined set of permissions if the communication changes the permissions of a file owned by a member of the common user group.

25. A system according to claim 18, wherein the first and second storage devices are associated with a general purpose multi-user operating system and wherein the members of the common user group include a group of users of the general purpose multi-user operating system.

26. A system according to claim 25, wherein the general purpose multi-user operating system is a Unix-type operating system.

27. A system according to claim 26, wherein the Unix-type operating system is selected from the group consisting of Unix, AIX, Solaris and Linux.

28. A system according to claim 18, wherein the first storage device is associated with a first data processing system and wherein the second storage device is associated with a second data processing system different from the first data processing system.

29. A system according to claim 28, wherein the common user group is established on the first data processing system, the system further comprising means for replicating the common user group on the second data processing system.

30. A computer program product for providing access to files which are mirrored between at least a first storage device and a second storage device, comprising:
- a computer-readable storage medium having computer-readable program code embodied in said medium, said computer-readable program code comprising:
- computer-readable program code which controls access to the first and second storage devices so that owners of files which are to be mirrored between the first and the second storage devices are members of a common user group;
- computer-readable program code which establishes a predefined set of permissions for files owned by members of the common user group;
- computer-readable program code which forces permissions of files owned by members of the common user group to include-at least the predefined set of permissions; and
- computer-readable program code which mirrors files owned by members of the common user group between the first and the second storage devices.

31. A computer program product according to claim 30, wherein the computer-readable program code which controls access comprises computer-readable program code which rejects an access of the first storage device if a user associated with the access is not a member of the common user group.

32. A computer program product according to claim 30, further comprising computer-readable program code which establishes a mirroring process as owned by a member of the common user group; and
wherein the computer-readable program code which mirrors files comprises computer-readable program code which mirrors files owned by members of the common user group between the first and the second storage devices utilizing the mirroring process.

33. A computer program product according to claim 30, wherein the computer-readable program code which forces permissions of files owned by members of the common user group to include at least the predefined set of permissions comprises:
- computer-readable program code which determines if a communication with a file system associated with the first storage device is from a member of the common user group;
- computer-readable program code which determines if the communication changes the permissions of a file owned by a member of the common user group; and
- computer-readable program code which ignores the permissions specified by the communication if the communication changes the permissions to a set of permissions which does not include the predefined set of permissions.

34. A computer program product according to claim 33, further comprising:
- computer-readable program code which intercepts the communication with the file system associated with the first storage device; and
- wherein the computer-readable program code which ignores the permissions comprises computer-readable program code which replaces permissions specified by the communication with a set of permissions which includes at least the predefined set of permissions if the communication changes the permissions of a file owned by a member of the common user group to a set of permissions which does not include the predefined set of permissions so as to provide a revised communication with the file system.

35. A computer program product according to claim 34, further comprising computer-readable program code which forwards the revised communication to the file system associated with the first storage device.

36. A computer program product according to claim 30, wherein the computer-readable program code which forces permissions of files owned by members of the common user group to include at least the predefined set of permissions comprises:
- computer-readable program code which determines if a communication with a file system associated with the first storage device is from a member of the common user group;
- computer-readable program code which determines if the communication changes the permissions of a file owned by a member of the common user group; and
- computer-readable program code which replaces the permissions specified by the communication with the predefined set of permissions if the communication changes the permissions of a file owned by a member of the common user group.

37. A computer program product according to claim 30, wherein the first and second storage devices are associated with a general purpose multi-user operating system and wherein the members of the common user group include a group of users of the general purpose multi-user operating system.

38. A computer program product according to claim 37, wherein the general purpose multi-user operating system is a Unix-type operating system.

39. A computer program product according to claim 38, wherein the Unix-type operating system is selected from the group consisting of Unix, AIX, Solaris and Linux.

40. A computer program product according to claim 30, wherein the first storage device is associated with a first data processing system and wherein the second storage device is associated with a second data processing system different from the first data processing system.

41. A computer program product according to claim 40, wherein the common user group is established on the first data processing system, the system further comprising computer-readable program code which replicates the common user group on the second data processing system.

* * * * *